United States Patent [19]

Byrd et al.

[11] 4,390,831
[45] Jun. 28, 1983

[54] ELECTROSTATIC PRECIPITATOR CONTROL

[75] Inventors: William Byrd, Princeton; Stephen J. Kohke, Martinsville, both of N.J.

[73] Assignee: Research-Cottrell, Inc., Somerville, N.J.

[21] Appl. No.: 264,577

[22] Filed: May 18, 1981

Related U.S. Application Data

[63] Continuation of Ser. No. 76,496, Sep. 17, 1979, abandoned.

[51] Int. Cl.³ .............................................. B03C 3/68
[52] U.S. Cl. ...................................... 323/240; 55/105; 323/238; 323/903; 363/54; 363/86
[58] Field of Search .............. 55/105, 139; 307/252 B, 307/252 T; 323/237, 238, 240, 242, 321, 326, 902, 903; 363/54, 85, 86, 91, 93, 128, 130

[56] References Cited

U.S. PATENT DOCUMENTS

| | | |
|---|---|---|
| 3,456,133 | 7/1969 | Warren ................................ 323/321 |
| 3,458,796 | 7/1969 | Cassady .............................. 323/238 |
| 3,507,096 | 4/1970 | Hall et al. ............................. 55/105 |
| 3,532,900 | 10/1970 | Rhyne ................................. 323/237 |
| 3,745,749 | 7/1973 | Gelfand ............................... 55/105 |
| 3,772,853 | 11/1973 | Burge et al. ......................... 55/105 |
| 3,873,282 | 3/1975 | Finch .................................. 55/105 |
| 3,940,684 | 2/1976 | Heinzman et al. .................. 323/902 |
| 4,152,124 | 5/1979 | Davis .................................. 55/105 |
| 4,267,502 | 5/1981 | Reese et al. ..................... 323/903 X |
| 4,290,003 | 9/1981 | Lanese ............................ 323/903 X |

OTHER PUBLICATIONS

Palm, "Chart Aids Selection of Optimum Led Driver", Electronics, Mar. 3, 1977, pp. 117, 119.

*Primary Examiner*—A. D. Pellinen
*Attorney, Agent, or Firm*—Paul & Paul

[57] ABSTRACT

Voltage and current supplied to the primary winding of the transformer-rectifier (T-R) set of an electrostatic precipitator via silicon-controlled rectifiers and a reactor are automatically controlled by sensing spit and spark discharges within the precipitator and the phase shift which occurs between line voltage and line current (usually referred to herein as primary current) when precipitator voltage drops to a low value, as caused by a heavy spark or arc. Signals are developed therefrom which are used to control precipitator voltage through phase control of the SCR's. An arc is extinguished at the end of the current one-half cycle in which it starts. An inhibit circuit is provided for preventing detectable transients caused by SCR turn on from falsely triggering the automatic control system thereby permitting increased sensitivity in the spit sensing circuit. Automatic soft-start brings precipitator voltage to the operating level both at start-up and after a process change, as evidenced by the absence of sensed spits, sparks, or arcs over a set interval of time which signifies the need for prompt upward adjustment of precipitator voltage. Precipitator current and voltage are limited and the power supply is disconnected when an undervoltage condition is detected. This is accomplished independently of the automatic control in response to spits, sparks and arcs.

25 Claims, 8 Drawing Figures

ELECTROSTATIC PRECIPITATOR CONTROL

This is a continuation of application Ser. No. 076,496, filed Sept. 17, 1979, now abandoned.

BACKGROUND OF THE INVENTION

Electrostatic precipitators have, for many years, served to remove suspended particles from streams of air or other gas. A particularly important application for these precipitators lies in the removal of fly ash from suspension in the gases emitted by large coal burning furnaces, such as those used in plants which generate electric power. The furnace gas passes through the precipitator before entering the smoke stack. The entire precipitator is composed of a number of sections, each of which has its own high voltage DC power supply. The circuit of a power supply may include a single-phase AC station power line, a circuit-breaker, silicon controlled rectifiers (SCRs) in inverse-parallel connection, a current-limiting reactor (CLR), and a transformer for producing a high AC secondary voltage which is electrically isolated from the station power line. Solid-state rectifiers may be used to convert the AC secondary voltage to unfiltered DC. The transformer and the rectifier are customarily packaged together and referred to as a Transformer-Rectifier Set (T/R Set). A section of the precipitator may be visualized as a duct containing vertically positioned metal plates in parallel arrangement. Electrodes, such as wires, which are connected together and to the high voltage output of the T/R Set, extend from a supporting structure downward between the plates, which are grounded.

In operation, the precipitator section must cause particles in the gas stream to move to and build up on the plates. This is accomplished by maintaining a DC voltage sufficient to produce a flow of ions from the electrodes to the plates. Automatic control of the production of ions, or corona, is essential to the proper functioning of the precipitator. It is also necessary to provide means for automatically controlling the removal of trapped particles. The matters of concern here are limited to the provision of means for automatically controlling the power input to the T/R Set of each precipitator section in a manner to improve its ability to prevent the escape of particulate matter and to use electrical energy efficiently.

In practice, the high voltage DC output of a T/R Set has been controlled largely through use of feedback signals produced by sparking between any of the HV electrodes and an adjacent grounded plate. Automatic means, in response to a spark signal, cut back the output of the T/R Set momentarily. The precipitator voltage was then gradually increased until another spark discharge occurred. In effect, the precipitator voltage was allowed to hunt between the voltages which produced sparking and substantially lower voltages. This mode of operation provided a control over spark rate which migh have a frequency as high as two sparks per second.

Figure 4:
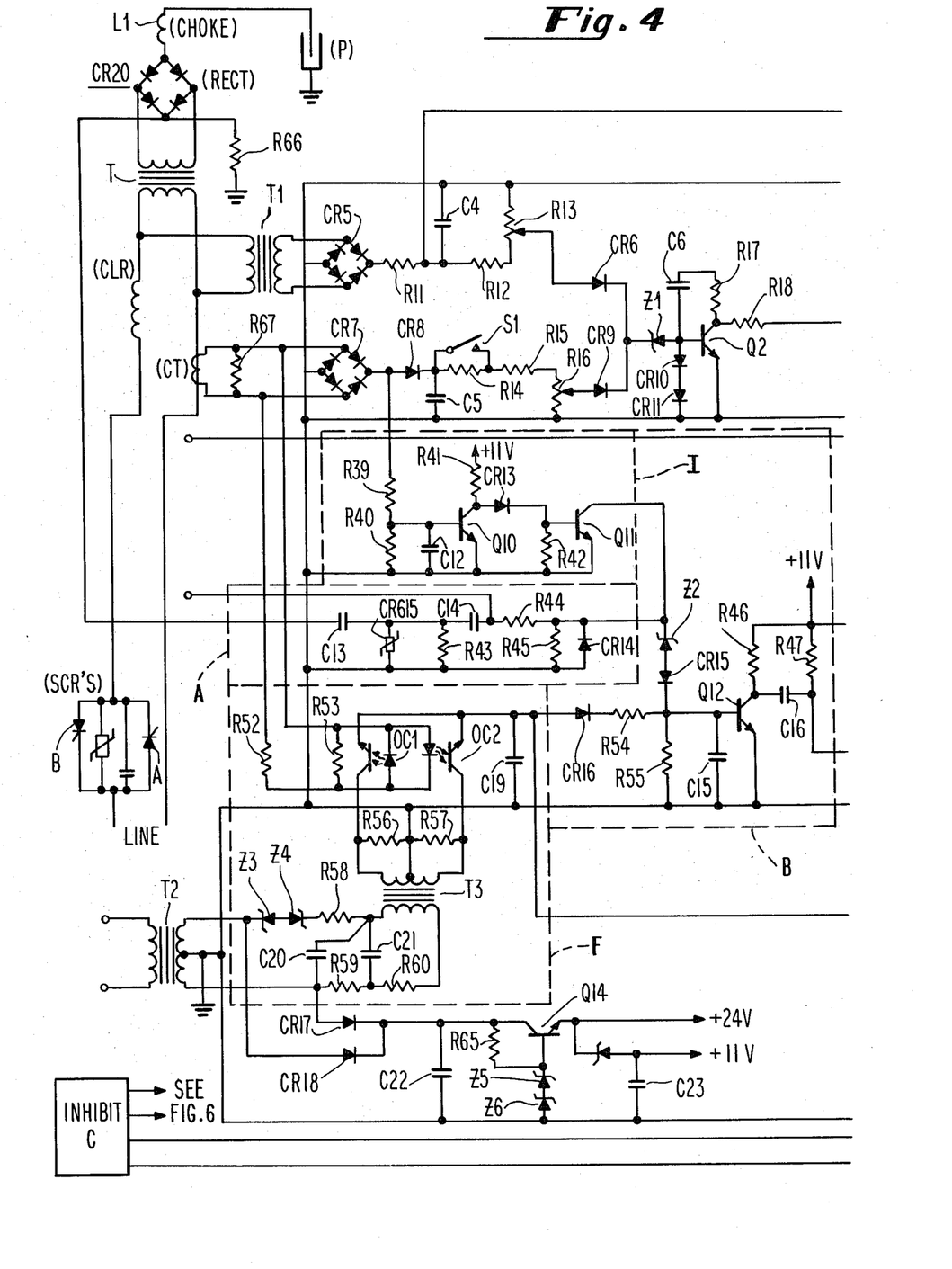
FIGS. 4-5 are schematic circuit diagrams which together illustrate the principal portions of an automatic control circuit according to the present invention, corresponding to blocks A, B, F, G, H. I and J of FIG. 1.

It is appropriate to explain here the function of the current-limiting reactor CLR in the primary circuit of the T/R Set, see FIG. 4. The inductance of this reactor should be such as to suit the normal range of load requirements of the precipitator section fed by the T/R Set. If a T/R Set is oversize with respect to its load, it may become necessary to increase reactor inductance to obtain proper performance of the T/R Set. The reactor serves these functions: It limits the rate of rise and the maximum primary current of the T/R Set during normal operation and in the event of a breakdown in either the power supply or in the precipitator. It stores energy while line current is increasing and returns this energy to the circuit while the line current is decreasing.

If the voltage of a precipitator were increased from zero to just below the point where corona develops, the precipitator would act as a capacitor, drawing charging current and storing energy ($\frac{1}{2} CV^2$ joules). As voltage is raised above the value where corona begins, the flow of ions from the HV electrodes to the plates, accelerates rapidly until spitting and sparking occur. Spitting, as here defined, is a low energy spark which causes a small drop in the precipitator's voltage and stored energy. A spark, as here defined, is a substantially heavier discharge which dissipates a larger portion of the energy capacitively stored in the precipitator. The precipitator voltage drops immediately to a lower value at which the spark discharge may end. The T/R Set is required to replace the loss of energy caused by the discharge and then to produce corona. Sparks may initiate power arcs that continue until the single phase AC supply to the T/R Set is interrupted. Frequent sparking is objectionable because each spark is followed by an interval during which the precipitator is inoperative, and then operative at reduced efficiency. A spark which develops into a power arc is more objectionable. Arcing may cause corona electrodes to break and short circuit the precipitator. A control system for the T/R Set capable of responding to spits can materially reduce the frequency of sparking and arcing. The precipitator's efficiency, in respect to trapping of particles and also in consumption of power, is then increased, and shutdowns for repairs become less frequent.

Reduction of sparking and arcing in all sections of a complete precipitator will materially reduce the production of transients which in quantity could have an adverse effect on a precipitator's overall performance.

SUMMARY OF THE INVENTION

A principal object of the present invention is to provide an improved system, using silicon-controlled rectifiers, for controlling the voltage applied to an electrostatic precipitator in which feedback circuitry is used which responds to spits as well as sparks, thereby permitting operation at a low spark rate.

Another object is to provide feedback circuitry which identifies a power arc during the half-cycle of primary current wherein the arc develops.

Another object is to provide circuitry for interrupting the power input to the T/R Set at the end of any half-cycle of primary current during which a power-arc occurs.

Another object is to provide circuitry for controlling the duration of the said power interruption and the rate at which precipitator voltage is reapplied.

Another object is to provide means for making the feedback circuitry which is responsive to spits and sparks unresponsive to SCR turn on and/or precipitator charging current immediately following SCR turn on, as defined hereinafter.

Another object is to provide means for slightly reducing T/R Set output in response to a spit (and optionally a spark) and then for increasing voltage at a controlled rate until another spit (or spark) occurs.

Another object is to include an improved form of magnetic amplifier for phase control of the SCR's.

Another object is to provide optional means for interrupting the power supply for a controlled millisecond interval following a spit or a spark and then for increasing precipitator voltage at a controlled rate until another spit or spark occurs. (This does not include sparks followed by power arcs which are covered by other circuitry referred to above).

Another object is to provide improvements in soft-start circuitry which insure a soft-start after any interruption of the power supply and which avoid an undesirably long delay in raising precipitator voltage to an effective operating level.

Another object is to include means of adjusting precipitator voltage expeditiously, to follow process changes, which means makes use of soft-start circuitry, a timing circuit and an interlock with the circuitry responsive to spits, sparks and arcs.

Another object is to limit bursts of spitting, sparking and arcing when a process change calls for lowering precipitator voltage, through means which inhibit undesirable interactions within the control system.

Another object is to provide in an SCR phase control system incorporating a magnetic amplifier circuit, means for instantly suppressing outputs to the SCR gates in response to a command signal, thereby to eliminate the inherent delay in magnetic amplifier response to a phase-back command via current passing through a control winding.

The term SCR turn on, as used herein, will now be defined. In steady-state operation, power as required is applied to the T/R Set by control of the intervals between zero-crossing of the AC line voltage and switch-on of the inverse-parallel connected SCRs. Once in conduction, a SCR acts as a closed switch which opens automatically when the undirectional current passing through it stops. The term SCR turn on, as here used, refers to the controlled switching-on of an SCR from its non-conducting state to its conducting state. In steady operation, a precipitator stores substantial energy ($\frac{1}{2}CV^2$). After stored energy has been dissipated by a spark discharge of a spark followed by a power arc, the T/R Set must meet an increased current demand to restore normal operating voltage. The spit and spark sense inhibited circuit described in the disclosure serves to shut-off the spit and spark-sensing circuit during intervals when the SCRs are carrying no current and also during controlled intervals encompassing SCR turn on. These are intervals during which a spit sensing circuit might otherwise perform improperly.

The present application relates to five separate aspects of precipitator control which may be identified as follows: (1) Arc Sensing based on Phase-Shift of AC Current; (2) Rapid Turn-Off; (3) Inhibiting Faulty Responses; (4) Voltage Control; and (5) Adjustability and Soft Start. Each of these will be briefly discussed in this Summary of the Invention.

(1) Arc Sensing-Based on Phase-Shift of AC Current

The prior art patent to Burge et al., U.S. Pat. No. 3,772,853, discloses a means of responding to significant reverse voltage tails which appear on the load side of the main SCRs when the AC current increases and shifts to a more lagging phase relationship with respect to line voltage. However, this condition must exist for a minimum of two successive half-cycles.

The method of the present application requires that AC current exceed a set minimum value following a set time-delay after each zero crossing of AC line voltage. Response is immediate, power being interrupted at the end of the current half-cycle in which the phase shift of current is detected. Use of a saturating transformer to produce strong AC voltage spikes at a set phase lag following reversals of line voltage together with a reverse polarity current gate through which positive voltage spikes must pass to trigger a timer or a SCR into an ON condition, is believed to combine simplicity, accuracy and novelty. Detection and extinguishing of an arc as quickly as possible is considered highly advantageous.

(2) Rapid Turn Off

The prior art patents to Hall, U.S. Pat. No. 3,507,096 and Gelfand, U.S. Pat. No. 3,745,749, both use phase controls of the magnetic amplifier type to control turn on of the main (inverse parallel) SCRs. Both patents also pass a relatively large signal current through a control winding of the magnetic amplifier top turn OFF gate outputs rapidly. If the signal current were allowed to exceed a limiting value, the magnetic amplifier could continue to output gate current to the SCRs which would be disastrous. When the signal current is held within a positively safe limit, full turn OFF of the SCRs may be delayed for one or more half-cycles of line voltage. The means provided by the present application, for suppressing the outputs to SCR gates in phase controls of the magnetic amplifier type, eliminates any delay in turning OFF outputs to the SCR gates. Immediate suppression of outputs to SCR gates is, however, possible in some prior SCR phase controls which are not of the magnetic amplifier type.

(3) Inhibiting Faulty Responses

A practical means of responding to spits can improve precipitator performance through a major reduction in sparking and arcing. In past efforts to use sufficient sensitivity to respond to spits, spurious signals, particularly those related to SCR turn on, have caused a problem. The means provided by the present invention of inhibiting these responses makes detection of spits practical. It is recognized that sparking and arcing in one section of a precipitator may induce a false spit response in another section. However, if sparking and arcing occur infrequently, false spit responses become inconsequential.

The means provided by the present application for gating the sensing circuit ON and OFF is simple and appears to be new and effective. Gelfand (U.S. Pat. No. 3,745,749) recognizes the value of a high sensitivity spark detector. His sensing circuit derives voltage pulses across his resistor 22 of his FIG. 1. This means of feedback for sensing sparks is old.

(4) Voltage Control

The basic system of voltage control as disclosed in the present application is not new. The present application provides the voltage control system with a variety of adjustments and responses for adapting the system to varying operating condition. The objective of the system is to maintain precipitator voltage within the most efficient operating range for as much of the time as possible while providing appropriate means for materially reducing or interrupting the supply voltage when the need to do so develops. (See also (5) below).

(5) Adjustability and Soft Start

Automatic systems for controlling precipitator voltage and current contain manual adjustments which set operating limits as is the case with the adjustments for limiting current and voltage.

Soft-Start circuitry serves the function of raising precipitator voltage to a value representative of normal operation at start-up or after voltage has dropped below the normal operating range due to any cause. A manual adjustment determines the voltage level at which the soft-start circuit, as herein disclosed, ceases to operate. To make full use of this adjustment, means are provided for rendering the soft-start circuit inoperative for a timed interval after the control system has sensed a spit, spark, or arc. It will be understood that process changes in a precipitator are common. Some may require operation at voltage levels below the value determined by the soft start adjustment. Automatic means for disconnecting the soft-start means suppresses rapid spitting, sparking and/or arcing, which the soft-start circuit, if operative, would then support.

DETAILED DESCRIPTION OF THE PREFERRED EMBODIMENTS

Figure 1:
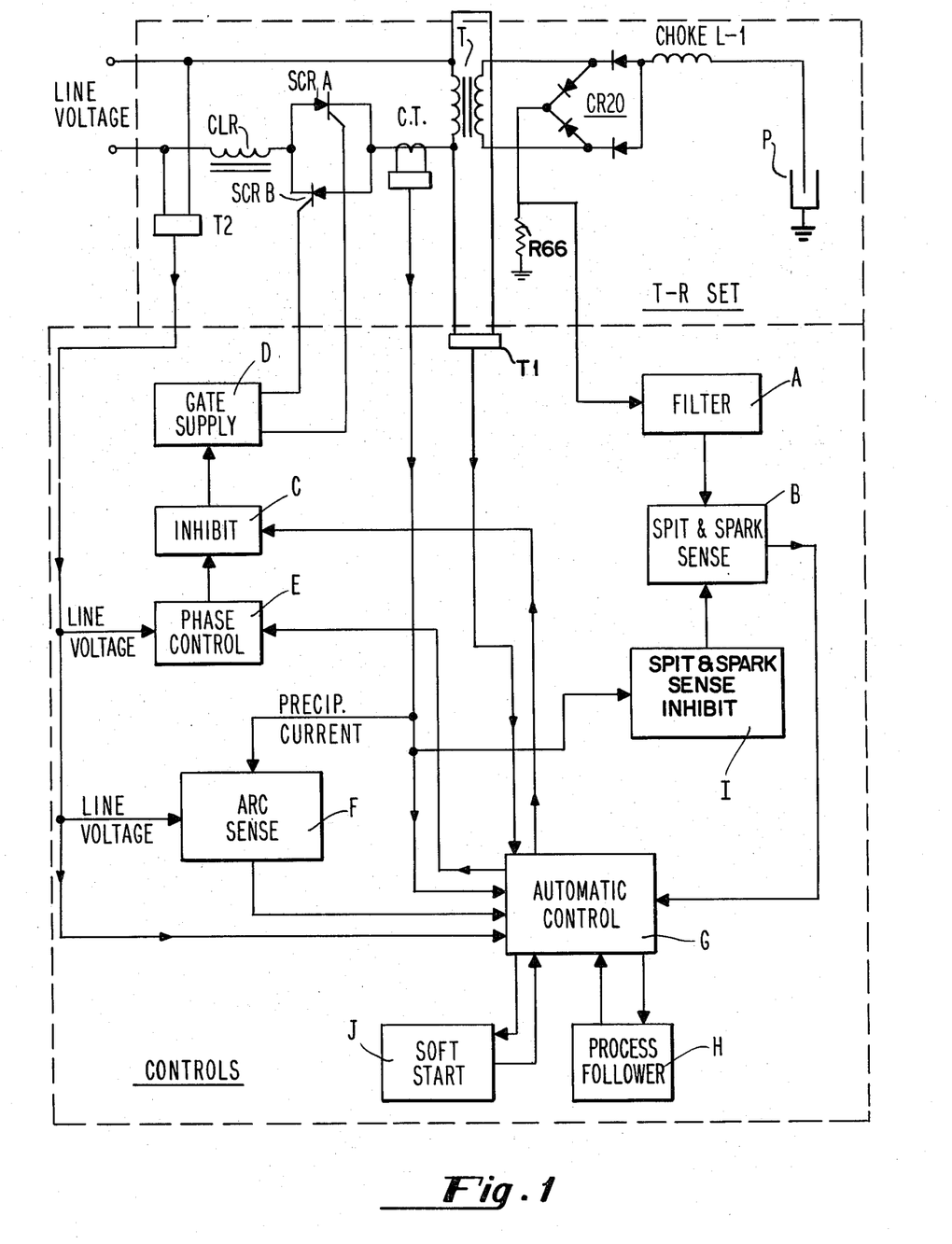
FIG. 1 is a block diagram, according to the present invention, of a control circuit for a transformer rectifier (TR).

Referring first to FIG. 1, the upper portion of this figure includes a schematic representation of the T-R set. Transformer T is illustrated as feeding a single precipitator section P through a full-wave high-voltage bridge rectifier CR20 and choke L1.

Figure 5:
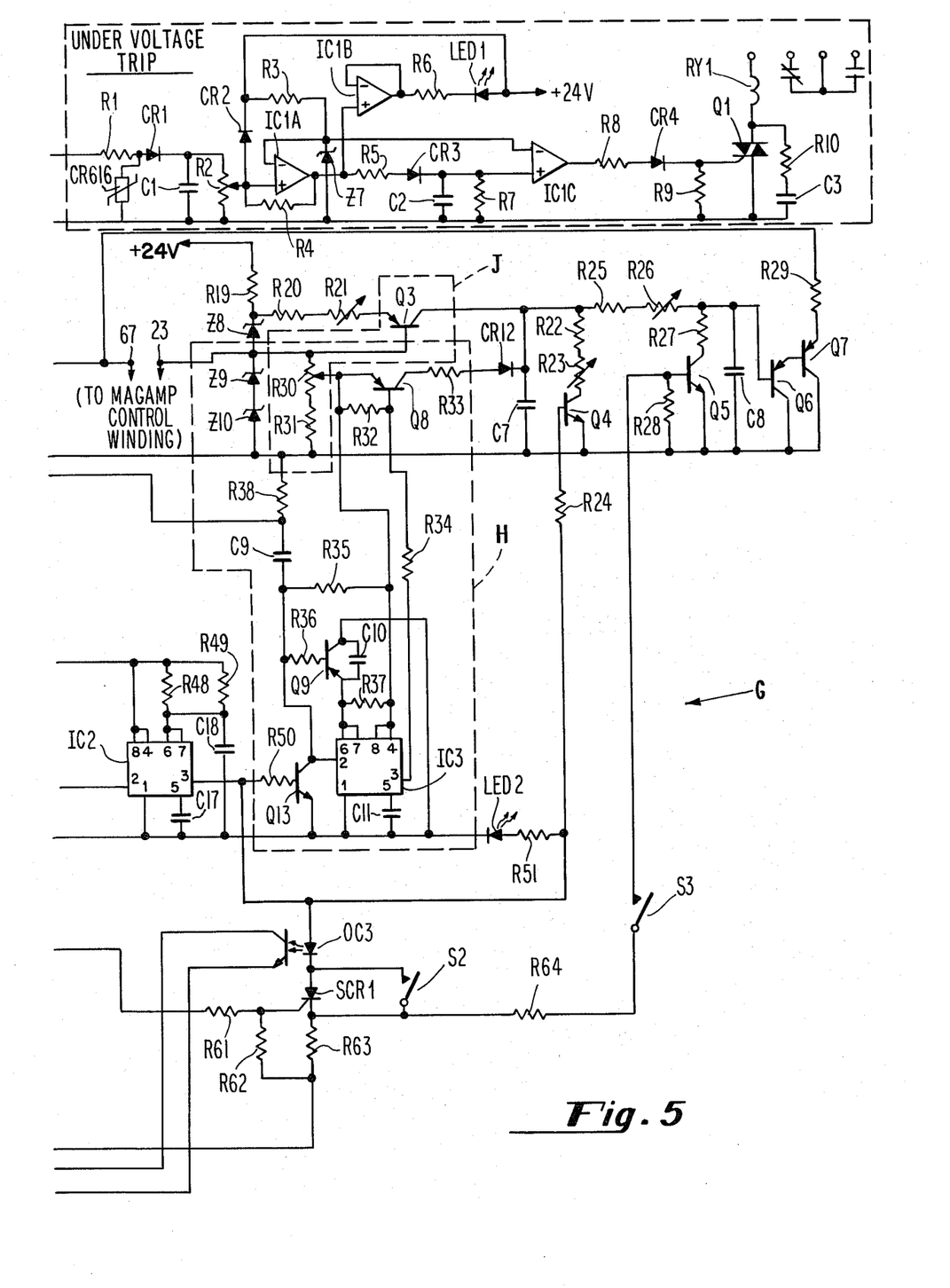

Transformer T1 is a potential transformer whose primary is in parallel with the primary of transformer T. The secondary of transformer T1 feeds both an undervoltage trip circuit and a voltage limiting portion of Automatic Control G. The undervoltage trip circuit (part of which is shown in FIG. 5) responds to continuing trouble in the power circuit by opening the line circuit breaker to shut down the power supply to the precipitator. The undervoltage trip circuit is dormant in the absence of trouble.

Transformer T2 is an isolation transformer whose function is to feed a voltage in phase with line voltage to the Phase Control E. Phase Control E contains a circuit which momentarily suppresses output to the Gate Supply D following application of voltage. This, in combination with Soft Start J and Burst Sense H, insures a satisfactory phase-on of SCR's A and B.

In FIG. 1, shown below the schematic illustration of the T-R set, is a block diagram showing the controls of the T-R set according to the present invention.

In FIG. 1 Filter A is a high pass filter which functions to attenuate low frequencies (60 and 120 hertz) to prevent false triggering. Spit & Spark Sense B allows a spit or spark to pass to Automatic Control G.

The function of Inhibit C is to instantly switch OFF or ON Gate Supply D to the SCR's upon command from Automatic Control G.

The function of Arc Sense F is to detect a shift in the phase between the line voltage and the primary current supplied to the high voltage transformer T when a heavy spark or arc occurs, and to deliver a signal to Automatic Control G.

The function of Automatic Control G is to receive signals from the various sensors and process them to change the voltage and current levels in the precipitator by way of Phase Control E.

The function of Phase Control E is to provide a signal which is phase controlled with respect to line voltage and which, in response to instructions from Automatic Control G, causes Gate Supply D to turn on the SCR's.

The function of Spit and Spark Sense Inhibit I is to prevent sensed signals caused by turn on of SCR's A and B from reaching Automatic Control G.

The function of Soft-Start J is to raise precipitator voltage to a level representative of normal operation at a controlled rate following an interruption of the power supply.

The function of Process Follower H is to inhibit operation of Soft Start J for timed intervals following sensed spits, sparks and arcs—thereby eliminating Soft-Start J as a source of adverse interaction on Automatic Control G.

Operation of Block Diagram (FIG. 1)

Figure 2:
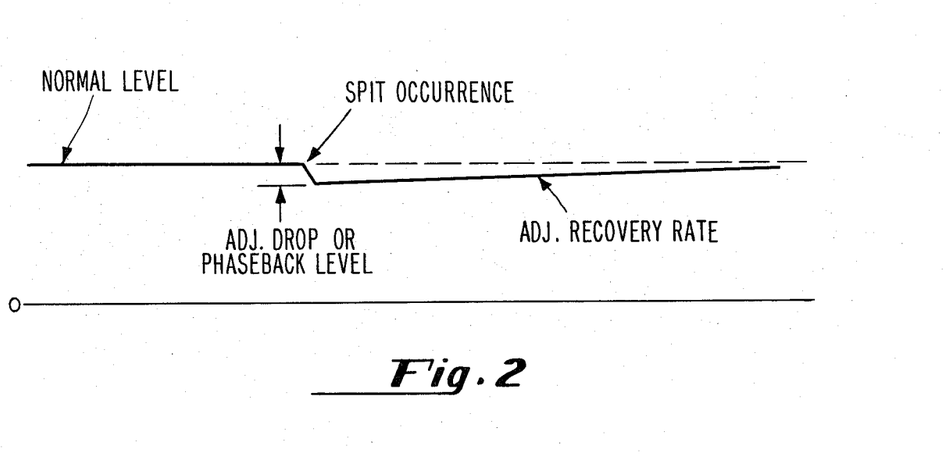
FIG. 2 is a voltage waveform illustrating the change in precipitator voltage achievable, in response to a spit, by the means provided by the present invention.

Assume that the precipitator has reached its normal operating level and that a spit then occurs. The spit produces a transient current through resistor R66 which sends a voitage pulse to Filter A. The pulse passes through Filter A and, if it then exceeds a set minimum voltage, it causes Spit and Spark Sense B to signal Automatic Control G. Spit and Spark Sense Inhibit I serves primarily to reject detectable pulses produced by SCR turn-on. After Automatic Control G receives the spit signal, it alters the output signal going to Phase Control E. This has the effect of lowering the precipitator voltage by a small amount, which is adjustable at Automatic Control G. This is illustrated by the voltage wave form shown in FIG. 2. The rate of recovery is along a ramp at a rate which is also adjustable by Automatic Control G.

Assume that, after the precipitator has reached its normal operating level, an arc or spark occurs, rather than a spit as just described. The control, and the reaction of the control, can be substantially the same for an arc and a spark, and thus, the following discussion will apply to both.

When an arc occurs, the primary voltage of the high voltage transformer T drops and the primary current increases. The inductive reactance in the circuit causes a phase lag of primary current with respect to line voltage. A phase sensor, block F, detects this phase shift and delivers an output signal to Automatic Control G. Automatic Control G then reacts as it did in the case of a spit described above, but in addition it also sends an output signal to Inhibit C. The effect is to shut off the Gate Supply D, removing power to the high voltage transformer T and hence to the precipitator P.

Figure 3:
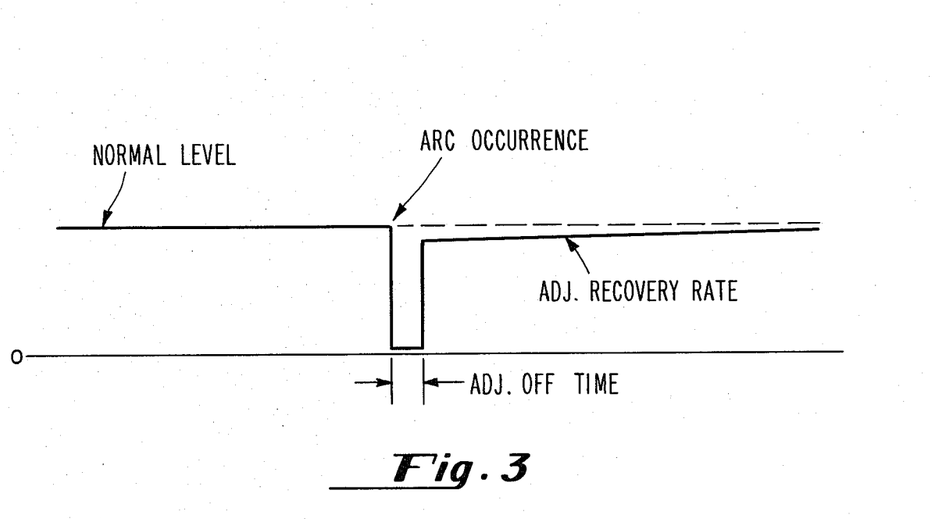
FIG. 3 is a voltage waveform illustrating the change in precipitator voltage achievable, in response to an arc, and, optionally, a spit or spark, by the means provided by the present invention.

The effect described above is illustrated by the voltage wave forms shown in FIG. 3. After a preselected short time interval, Automatic Control G terminates the output signal to Inhibit C, and Gate Supply D becomes operative. The precipitator recharge current does not affect phase shift sensor F. This allows the precipitator to be brought quickly to its proper operating level, thereby eliminating the relatively slow turn-on periods which had been characteristic of the prior art.

Occasionally a burst of spits, sparks or arcs, may occur which causes Automatic Control G to adjust the precipitator voltage to an abnormally low operating level. Soft-Start J is prevented from attempting to raise precipitator voltage by Process Follower H until a set interval has passed following cessation of the bursting. Soft-Start J is then activated to raise precipitator voltage quickly to the normal operating level. However, if sparking develops before this voltage level is reached, the Soft-Start J circuit is again switched OFF for the interval controlled by Process Follower H.

Operation of Circuit Diagrams (FIGS. 4-5 and 6-7)

Referring now to FIGS. 4-5 and 6-7, these figures contain schematic circuit diagrams showing the components and circuits contained in the various blocks identified A through J in FIG. 1. The components and circuits contained within each of the blocks of FIG. 1 are delineated in FIGS. 4-7 by the dotted lines and the areas enclosed, appropriately identified A-C and E through J, the remainder being components of D.

To avoid over-crowding of the drawing, values for each of the various components are not shown in the circuit diagrams of FIGS. 4-5 and 6-7 but component values are presented herebelow. The values shown below are for the purpose of complying with the requirement that the specification contain a written description in such full and exact terms as to enable any person skilled in the art to make and use the same, and it is to be understood that the values may be varied without departing from the invention the scope of which is defined in the claims.

Resistor Values (FIGS. 4-5)

| No. | Value (ohms) | No. | Value (ohms) |
|---|---|---|---|
| R1 | 6.8K | R25 | 4.7K |
| R2 | 50K | R26 | 250K |
| R3 | 2.7K | R27 | 4.7K |
| R4 | 470K | R28 | 10K |
| R5 | 2.7K | R29 | 3.3K |
| R6 | 2.7K | R30 | 1K |
| R7 | 8.2M | R31 | 1K |
| R8 | 2.7K | R32 | 47K |
| R9 | 1K | R33 | 10K |
| R10 | 150 | R34 | 10K |
| R11 | 1K | R35 | 10K |
| R12 | 1K | R36 | 4.7K |
| R13 | 2.5K | R37 | 8.2K |
| R14 | 1.5K | R38 | 560 |
| R15 | 180 | R39 | 6.8K |
| R16 | 2.5K | R40 | 1K |
| R17 | 15K | R41 | 2.7K |
| R18 | 3.9K | R42 | 10K |
| R19 | 180 | R43 | 33K |
| R20 | 100K | R44 | 1K |
| R21 | 2M | R45 | 33K |
| R22 | 3.9K | R46 | 10K |
| R23 | 50K | R47 | 10K |
| R24 | 2.7K | R48 | 100K |

Resistor Values FIGS. 4-5 / Zener Diodes (FIGS. 4-5)

| No. | Value (ohms) | No. | Volts |
|---|---|---|---|
| R49 | 11K | Z1 | 5-6 |
| R50 | 4.7K | Z2 | 6.2 |
| R51 | 1K | Z3 | 26 |
| R52 | 2.7K | Z4 | 26 |
| R53 | 10K | Z5 | 13 |
| R54 | 1K | Z6 | 13 |
| R55 | 4.7K | Z7 | 5 |
| R56 | 6.8K | Z8 | 7 |
| R57 | 6.8K | Z9 | 7 |
| R58 | 120 | Z10 | 7 |
| R59 | 120 | | |
| R60 | 6.8K | | |
| R61 | 1K | | |
| R62 | 1.5K | | |
| R63 | 560 | | |
| R64 | 2.7K | | |
| R65 | 2.2.k | | |
| R66 | 100 | | |
| R67 | 750 | | |

Capacitor Values (FIGS. 4-5)

| No. | Value (mfd) |
|---|---|
| C1 | 1.5 |
| C2 | 2.7 |
| C3 | .05 |
| C4 | .22 |
| C5 | .22 |
| C6 | 5.6 |
| C7 | 240 |
| C8 | .68 |
| C9 | .22 |
| C10 | 1.5 |
| C11 | .01 |
| C12 | .01 |
| C13 | .005 |
| C14 | .005 |
| C15 | .01 |
| C16 | .1 |
| C17 | .01 |
| C18 | 1.5 |
| C19 | .68 |
| C20 | .05 |
| C21 | .05 |
| C22 | 250 |
| C23 | 100 |

Transistor Types (FIGS. 4-5)

| No. | Ident. |
|---|---|
| Q1 | 2N6073B (TRIAC) |
| Q2 | 2N5449 |
| Q3 | 2N5323 |
| Q4 | 2N5449 |
| Q5 | 2N5449 |
| Q6 | 2N5323 |
| Q7 | 2N5323 |
| Q8 | 2N5448 |
| Q9 | 2N5448 |
| Q10 | 2N5449 |
| Q11 | 2N5449 |
| Q12 | 2N5449 |
| Q13 | 2N5449 |
| Q14 | 2N6386 |

Light-Emitting Diodes (FIGS. 4-5)

| | |
|---|---|
| LED 1 | TIL 220 |
| LED 2 | TIL 220 |

Silicon Controlled Rectifiers (FIGS. 4-5)

| | |
|---|---|
| SCR 1 | TIC 45 |

Diodes (FIGS. 4-5)

| | |
|---|---|
| ALL DIODES | IN4004 |

Opto-isolators, i.e. Opto-couplers (FIGS. 4-5)

| | |
|---|---|
| OC-1 | H15-B2 |
| OC-2 | H15-B2 |
| OC-3 | H15-B2 |

Figure 6:
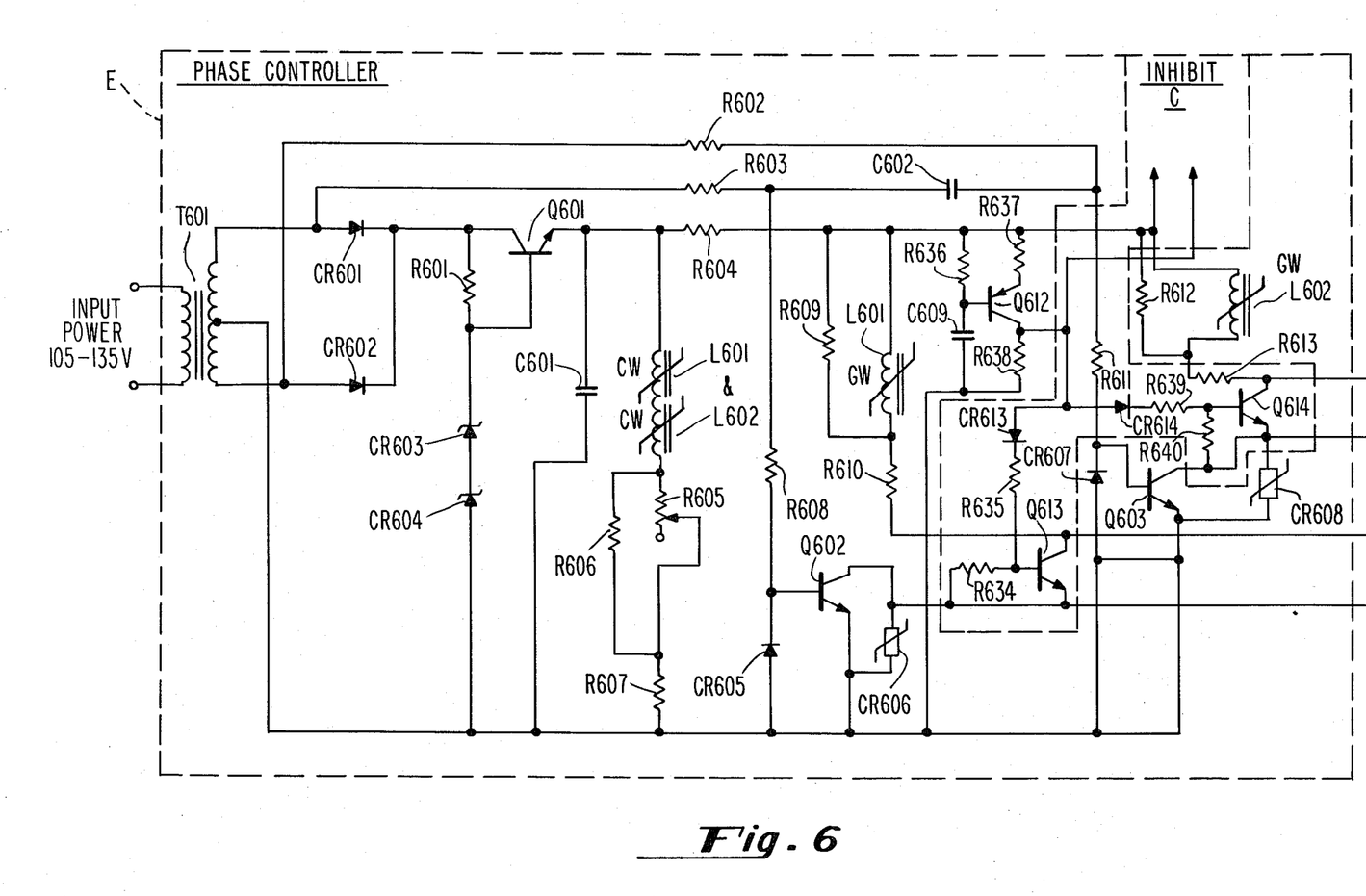
FIGS. 6-7 are schematic circuit diagrams corresponding to blocks C, D and E of FIG. 1.
Figure 7:
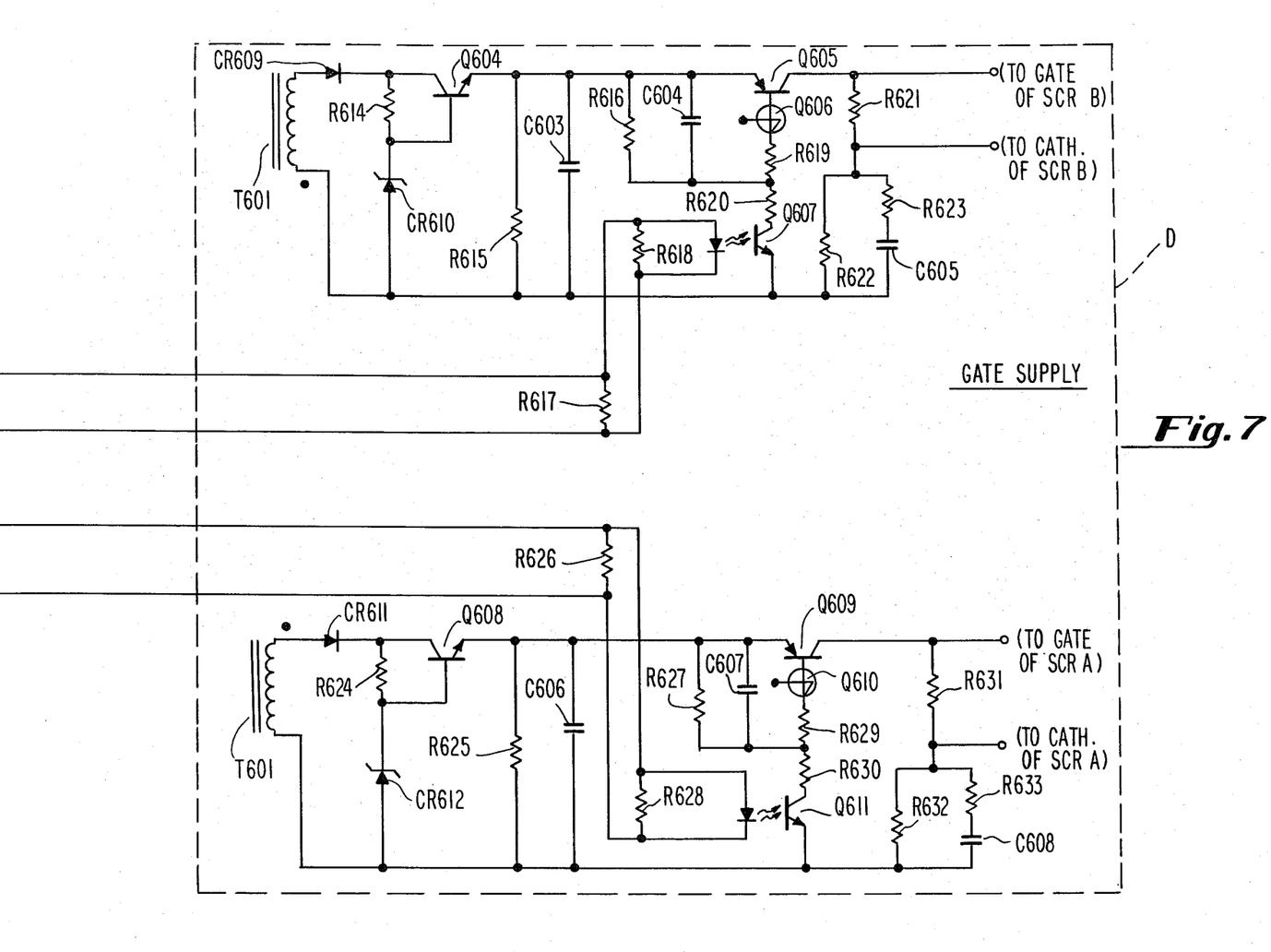

Resistor Values (FIGS. 6-7)

| No. | Value (ohms) |
|---|---|
| R601 | 1K |
| R602 | 150 |
| R603 | 150 |
| R604 | 10 |
| R605 | 1.5K |
| R606 | 2K-47K |
| R607 | 2K-6.8K |
| R608 | 1.5K |

-continued

| No. | Value |
|---|---|
| R609 | 91K (MIN.) |
| R610 | 470 |
| R611 | 1.5K |
| R612 | 91K (MIN.) |
| R613 | 470 |
| R614 | 820 |
| R615 | 4.7K |
| R616 | 6.8K |
| R617 | 100-680 |
| R618 | 150 |
| R619 | 100 |
| R620 | 270 |
| R621 | 220 |
| R622 | 35 |
| R623 | 3.9 |
| R624 | 820 |
| R625 | 4.7K |
| R626 | 100-680 |
| R627 | 6.8K |
| R628 | 150 |
| R629 | 100 |
| R630 | 270 |
| R631 | 220 |
| R632 | 35 |
| R633 | 3.9 |
| R634 | 10K |
| R635 | 1.5K |
| R636 | 10K |
| R637 | 1.5K |
| R638 | 10K |
| R639 | 1.5K |
| R640 | 10K |

Capacitor Value (FIGS. 6-7)

| No. | Value (mfd) |
|---|---|
| C601 | 250 |
| C602 | 0.1 |
| C603 | 250 |
| C604 | 0.1 |
| C605 | 2.7 |
| C606 | 250 |
| C607 | 0.1 |
| C608 | 2.7 |
| C609 | 2.7 |

Transistor Types (FIGS. 6-7)

| No. | Type |
|---|---|
| Q601 | 2N6386 |
| Q602 | 2N2270 |
| Q603 | 2N2270 |
| Q604 | 2N6386 |
| Q605 | 2N5323 |
| Q606 | 2N4990 |
| Q607 | H15-B2 (opto-isolator, i.e., opto-coupler) |
| Q608 | 2N6386 |
| Q609 | 2N5323 |
| Q610 | 2N4990 |
| Q611 | H15-B2 (opto-isolator, i.e., opto-coupler) |
| Q612 | 2N5323 |
| Q613 | 2N2270 |
| Q614 | 2N2270 |

Diodes

| No. | Type |
|---|---|
| CR601 | IN4003 |
| CR602 | In4003 |
| CR603 | Zener (12.6-13.6v) |
| CR604 | Zener (12.6-13.6v) |
| CR605 | IN4003 |
| CR606 | V39MA2A (Varistor) |
| CR607 | IN4003 |
| CR608 | V39MA2A (Varistor) |
| CR609 | IN5624 |
| CR610 | Zener (18V) |
| CR611 | IN5624 |
| CR612 | Zener (18V) |
| CR613 | IN4003 |
| CR614 | IN4003 |
| CR615 | V39Z (Varistor) |
| CR616 | V39Z (Varistor) |

Operation of Circuitry (FIGS. 4-5 and 6-7)

Operation of the circuits shown schematically in FIGS. 4-5 and 6-7, and represented in FIG. 1 by the block diagrams, will now be described in sufficient detail to enable a person skilled in the art to understand the same.

Operaton of Phase Control E, Inhibit C and Gate Supply D

The phase control is of the magnetic amplifier type, which is preferred for the precipitator application. A disadvantage of conventional magnetic amplifier control lies in its inability to terminate gate current instantly when an appropriate phase-back signal is applied to a control winding. The response time of the amplifier may result in a delay of one-half to several cycles of line frequency before gate currents stop.

To overcome the disadvantage indicated above, the gate currents of the magnetic amplifier phase control are not fed directly to the SCR gate supply (FIG. 7). Instead, they are passed through the diodes of opto-isolators Q607 and Q611. With each of these diodes is an electrically isolated transistor which is in the ON state only when its associated diode carries forward current (milliamperes). The transistors switch ON power transistors Q605 and Q609 which feed current from two isolated DC supplies to the gates of SCRs A and B. In order to interrupt SCR gate currents immediately on command from the automatic control, transistor circuitry is used to cause the magnetic amplifier's gate currents to bypass the opto-isolator diodes of Q607 and Q611.

Inhibit C makes possible interruption of the power supply to a T/R Set at the end of any half-cycle of line current during which a detected spit, spark or arc occurs in the precipitator.

Referring to the lower channel of FIG. 7, it will be seen that SCR gate-to-cathode current occurs when power transistor Q609 conducts. This happens only when opto-isolator Q611 is ON.

Referring to FIGS. 6 and 7, L610-GW and L602-GW (FIG. 6) represent the magnetic amplifier's two cores and their gate windings. Upon saturation of L601, current travels from positive DC through R610, then through the diode of Q611 (FIG. 7) and through transistor Q602, (FIG. 6) to negative. Q602 conducts only during the positive half-cycles of the secondary voltage of transformer T601. (Q603 is ON during the negative half-cycle of T601). R609 is a high impedance resistor which, together with R612, may be needed to bring the positive and negative half-cycle magnetic amplifier outputs into balance. R610 and the resistance of winding L601-GW determine the amplitude of gate current during positive half cycles of AC voltage. Resistors R626 and R628 of the lower channel of FIG. 7, and R617 and R618 of the upper channel of FIG. 7, permit magnetic ampifier exciting current and a portion of the gate current (current following core saturation) to bypass the diodes of opto-isolators Q607 and Q611. These resistors also serve to compensate for differences in sensitivity between the opto-isolator diodes. An interesting feature of the phase controller lies in its conversion of the sinusoidal AC voltage supply to a filtered and voltage-regulated DC and then its inversion of this DC to square wave AC for use in the magnetic amplifier's gate circuits. This provision of voltage-regulated square wave AC gives improved phase control.

Refer to INHIBIT C in the top right portion of FIG. 6, and to opto-isolator OC3 of INHIBIT C shown in the bottom central portion of FIG. 5. When the Automatic Control switches OC3 ON, as will be explained later, transistors Q613 and Q614 (FIG. 6) receive base drive and also switch ON. This causes Q611 and Q607 of FIG. 7 to turn OFF since diode current has been diverted. The gate supply to the SCRs is thus interrupted whenever opto-isolator OC3 is ON.

Following an interruption of the power supply to the Phase Controller E (FIG. 6), capacitor C601 will discharge its stored energy. When power is reapplied to the phase controller, it is desirable to suppress momentarily gate currents that could develop because of core memory. A delay is provided by transistor Q612 in combination with R636, R637, R638, and C609. It will be seen that Q612 is held ON as long as C609 is drawing enough charging current to provide emitter-base drive. While Q612 is ON, the supply to the SCR gates is interrupted, as it is when OC3 is ON. Q612, by holding the gate supply OFF momentarily, provides an interval for resetting L601 and L602 core flux (erasure of memory) by the automatic control. The circuitry of Q612 is actually a part of the soft-start provision.

Operation of Automatic Control G and Soft Start J

Referring to FIGS. 4 and 5, transistors Q2, Q4 and Q5 are normally OFF unless switched ON by base-emitter currents from sources controlled by feedback signals. Transistor Q3 (FIG. 5) in conjunction with R20, R21, and the 7 V emitter-base zener diode Z8, provides a constant current output at its collector terminal. Resistor R21 permits adjustment of this current and is called the Ramp Rate Adjustment. Current from the +24 V supply maintains the base of Q3 at 14 volts above ground as determined by Z9 and Z10. The magnetic amplifier's phased output signals are zero (phased back 180°) when the emitter voltage of Q7 is within several volts of ground. In this condition, the current in the magnetic amplifier's control winding is determined chiefly by the voltage (14 V) and R29. As the voltage of C8 rises, the current in the control winding decreases and gate currents develop and are gradually phased forward. Since C7 and C8 are charged slowly from a discharged state, the phasing ON of the SCRs feeding the T/R Set is a gradual process. This process will, however, continue until Q2 or Q4 (and Q5 if its base drive circuit is closed) is switched ON. It should be noted that C7 and C8 discharge rapidly to ground via Q3, R30 and R31 whenever power is lost. This is because Q3 is a PNP transistor and, when positive voltage is lost, its emitter is open and its collector-base (PN junction) acts as a diode conducting from collector to base. The discharge time of C7 is determined by the RC time constant, which is the product of C7×(R30+R31). On the basis of the values given for these items in the tables presented hereinbefore, this RC time constant is 0.48 second which is very short in comparison with the time required to charge C7 and C8 via Q3. Control of the rate of recovery of voltage at C7 is described in connection with the operation of IC3 Timer. This, together with a provision for resetting magnetic amplifier core flux, as already described, insures a soft start when power is regained. Further description of the soft start operation is also given in connection with the operation of IC3 Timer.

Operation of Voltage and Current Limiting

FIG. 4 shows Potential Transformer T1 whose primary is in parallel with the primary of transformer T (see FIG. 1 also). The secondary of T1 connects to a bridge rectifier CR5 whose output feeds both the undervoltage trip circuit and the voltage limiting circuit. The voltage limiting circuit includes an RC integrator whose output voltage can be varied by adjustment of R13. When this voltage exceeds 6 to 7 volts, Q2 receives base current and turn ON accordingly. Current then travels from terminal 23 (pos. 14 V) through the magnetic amplifier control winding to terminal 67 of FIG. 5 and thence through R18 and Q2 to ground (neg). This causes the magnetic amplifier to phase back its output signals until the reduced feedback voltage is insufficient to hold Q2 ON. Negative feedback provided by C6 and R17 serves to eliminate any undesirable hunting condition. The current-limiting circuit operates in the same manner. The secondary current of the Current transformer (CT) is rectified and passed through a RC integrator. An adjustable output voltage is obtained at R16. As in the case of voltage limiting, Q2 is turned ON when the voltage at the output of R16 exceeds 6 to 7 volts, again causing phase back of the magnetic amplifier output signals.

The rectified output of the current transformer (CT) is also used to turn ON Q10, thus turning OFF Q11 of Spit and Spark Sense Inhibit I. Resistors R39, R40 and Capacitor C12 delay the turn ON of Q10 until the rising load current exceeds a controlled minimum value.

A further use of current transformer current is made in the Arc Sense F, as will be described.

Operation of Filter A and Split/Spark Sense B and Split and Spark Sense Inhibit I Referring to FIG. 4, a current pulse to ground from the DC output of the H.V. rectifier, as caused by a spit or spark in a precipitator section, produces a voltage pulse across R66 which enters the high pass filter at C13. An 11 VDC source is shown in the dotted rectangle I. When Q10 is OFF, current from this DC source flows through R41 and CR13 and into the base circuit of Q11, thus turning Q11 ON which places a shunt across R45 of Filter A, to render inoperative the Spit and Spark Sense B. It will be seen that base drive applied to Q10 serves to turn OFF Q11 and remove the shunt across R45. If a voltage pulse of more than about 7 volts should thereafter appear at R45 sufficient current will flow via Z2, CR15 into the base emitter circuit of Q12 to turn on Q12 momentarily, which serves to trigger the IC-2 timer of Automatic Control G into its set ON time. This turn-on at Q10 is controlled by current derived from the secondary circuit of the current transformer CT.

Use of Spit and Spark Sense Inhibit Circuit I does not detract from the efficacy of the Spit and Spark Sensing Circuit B in triggering IC2. This sensing circuit becomes operative about 0.2 millisecond after SCR turn on and remains operative until load current nears zero at the end of current half-cycles. Spit and Spark Sense Inhibit I by suppressing voltage pulses related to SCR turn on allows an increase in sensitivity of the spit and spark sensing circuit. Controlling precipitator operation more through response to spits than to sparks and arcs improves overall performance.

Arc Sensing

In normal operation, a T/R Set delivering HVDC to a precipitator section sees a high impedance load (many thousand ohms). This impedance is drastically reduced when an arc occurs within the precipitator. In effect an arc is similar to a short-circuited load. The impedances which then serve to limit the primary current of the T/R Set are usually provided chiefly by the inductances of the current limiting reactor and the transformer's windings. Because the circuit impedance is now largely inductive, the primary current shifts in a lagging direction with respect to line voltage. This results in a condition where the reversals of primary current are delayed with respect to the reversals of line voltage. This condition may also result when a heavy spark has discharged most of the precipitator's stored energy without starting an arc.

Referring to FIG. 4, transformer T2 has an output voltage in phase with the line voltage, and feeds, via back-to-back zener diodes Z3–Z4 and an RC network, the primary of saturating transformer T3. Accordingly, voltage is not applied to the primary of T3 until a controlled time-delay following zero crossing of line voltage.

Figure 8:
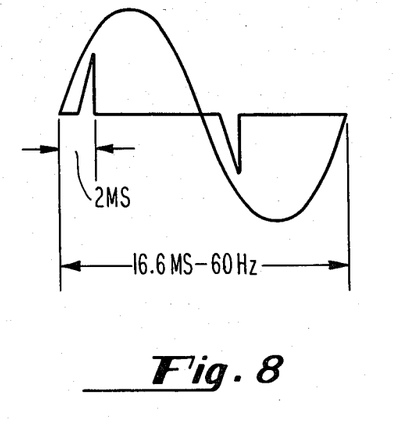
FIG. 8 shows the voltage output of transformers T2 and T3 of FIG. 4.

FIG. 8 shows the 60 HZ output voltage of transformer T2 and the output voltage pulses of the saturating transformer T3. These pulses occur after a delay of about 2 milliseconds following each zero crossing of the secondary voltage of T2. This delay can be shortened or lengthened by component substitution.

Referring to FIGS. 4 and 5, it will be seen that use is made of output pulses from the saturating transformer T3 which are positive with respect to the center-tap of T3. If the appropriate opto-isolator, OC1 or OC2, is ON when a positive voltage pulse occurs, Q12 will trigger IC2 into its set ON time. The diodes of OC1 and OC2 receive current from the secondary of the current transformer CT. These diodes are so connected that line current must have reverse polarity with respect to line voltage in order that the positive voltage pulses can be transmitted to the base of Q12. The resistances R52 and R53 determine the minimum reverse line current required for sensing a current phase shift.

In addition to triggering IC2 into its set ON time, an output of the arc-sensing circuit switches SCR1 ON which inhibits output from the gate supply thereby holding the SCRs A and B OFF until IC2 times out.

Operation of IC2 Timer

It has been described how the voltage applied to the T/R Set is phase controlled by the switching ON and OFF of transistors Q2,Q4, and Q5, how Q2 is switched to provide current and voltage limiting, and how spits, sparks and arcs trigger IC2 from its normally OFF state to its timed ON state. When IC2 is OFF, terminal 3 is at ground potential and when IC2 is ON terminal 3 is positive with respect to ground. When terminal 3 is positive, transistor Q4 is On and causes a gradual phase back of voltage applied to the T/R set. Also, the spark indicating LED is lit. Additionally Inhibit C is operating to hold the main SCRs OFF provided the Interrupt-ALL switch S2 is closed or provided a sensed arc has switched SCR-1 ON (FIG. 5). Transistor Q5 will be ON if S3 is also closed and will fully discharge C8. This will cause the gate outputs of the phase control's magnetic amplifier to phase back rapidly. The voltage of C7 will drop slightly. The voltage of C8 will recover rapidly after IC2 times out. With S2 open, only the arc sensing circuit can cause Inhibit C to interrupt power to the T/R Set by suppressing the gate outputs to the main SCRs. The turn ON of IC2 serves also to turn ON IC3 timer.

SOFT START, OPERATION OF IC3 TIMER, AND PROCESS FOLLOWER (see operation of Automatic Control G and Soft Start J ad IC2 Timer)

Means whereby the voltage of Capacitor C7 controls precipitator voltage have been described. Means whereby C7 is discharged rapidly following interruption of the power supply have also been described, together with means for inhibiting momentarily the gating ON of SCRs A and B upon restoration of power. These means are part of the soft-start means for applying voltage to the precipitator. The constant current means for increasing the voltage of C7 by way of transistor Q3 has also been described. Since this means produces a slow rate of increase in precipitator voltage, minutes may be required to bring precipitator voltage to the point where the control system can operate in responce to sensed spits, sparks or arcs. To eliminate this long long delay, auxiliary circuit means is provided for charging C7. This means includes resistors R30, R31, R32, R33, transistors Q8 and diode CR12 (see FIG. 5). When there is no spitting, sparking or arcing to turn IC2 and IC3 ON, terminal 3 of IC3 is at ground potential (negative) and Q8 is ON. The auxiliary charging means serves to bring the voltage of C7 to either the value at which CR12 becomes back biased as determined by the setting of R30 or the start of sensed spitting, sparking, or arcing in the precipitator, whichever occurs first.

Insofar as start-up is concerned, Q8 could be replaced by a jumper. There is need for a means for opening the auxiliary charging circuit when bursts of spits, sparks or arcs have caused the voltage of C7 to drop below the value at which CR12 becomes forward biased. To make full use of the R30 adjustment a process follower circuit which includes timer IC3 is employed. The IC3 circuit turns ON to turn Q8 OFF whenever IC2 is turned ON. While IC2 and IC3 are both ON, IC3 cannot start its set timing interval because its timing capacitor C10 is shorted by Q9. Following the turning OFF of IC2, the full timing interval of IC3 must elapse without another turn ON of IC2 before IC3 can turn OFF to turn ON Q8 thereby reactivating the auxiliary circuit for quickly charging C7. It will be seen that the auxiliary means described for charging C7 insure that response of Automatic Control G to sparking will not be adversely affected and that precipitator voltage after being depressed in response to excessive sparking as caused by a temporary process change will be raised expeditiously when operating conditions improve.

In the claims which follow, the term "spark sensing means" is to be understood to include resistor 66, Filter A, and Spit and Spark Sense B, as shown in FIG. 1 and also in FIG. 4.

What is claimed is:

1. Electronic apparatus providing means for controlling AC voltage and current supplied from a source to the primary of a transformer/rectifier set (T/R set) feeding a load circuit comprising an electrostatic precipitator which is subject to spitting, sparking, arcing or shorting, said control means comprising:

a. inductive series impedance in the circuit of said transformer sufficient to limit transient primary currents to an acceptable maximum value in the event of said spitting, sparking, arcing or shorting in said load circuit;
b. a pair of silicon controlled rectifiers (SCR's) in inverse-parallel connection in circuit with said primary of said transformer of said T/R set;
c. gate current supply means connected to the gates of said SCR's for controlling the condition thereof;
d. phase control means for providing output signals which are phase controlled with respect to line voltage;
e. means for supplying voltage representative of AC line voltage to said phase control means;
f. means for developing an AC current signal whose instantaneous values and polarities represent the instantaneous values of current drawn from the source of AC voltage;
g. means for developing an AC voltage pulse during a set time interval following each zero crossing of the AC voltage supply, the polarity of said voltage pulse being the same as the polarity of said AC voltage supply during said set interval;
h. AC sensing means developed by said AC current signals and said AC voltage pulses for producing an output signal only when said current signal exceeds a set minimum value during a voltage pulse and has reverse polarity with respect to the polarity of said voltage pulse;
i. direct current sensing means for developing output signals in response to sudden changes of current in the load circuit of said T/R set resulting from said spitting and sparking;
j. an automatic control system;
k. means for applying said output signals developed by either or both of said sensing means to said automatic control system;
l. means for applying output signals from said automatic control system to said phase control means;
m. means for applying output signals from said phase control means to said gate current supply means for controlling the conduction of said SCR's.

2. Apparatus according to claim 1 wherein:
a. a first timer circuit is provided;
b. said automatic control system and said phase control means include means instantly responsive to output signals from said AC sensing means for activating said first timer circuit;
c. said first timer circuit includes means for developing an output signal of set duration following said activation;
d. inhibit means are provided responsive to said output signal from said first timer circuit for inhibiting output from the gate-current supply means, thereby to prevent SCR turn-ons for the duration of said output signal of said first timer circuit.

3. Apparatus according to claim 1 wherein said phase control means is of the magnetic amplifier type and wherein the said automatic control system includes a capacitor which receives charging current to increase its voltage at a controlled rate in the absence of said output signals developed by said AC sensing means or by said direct current sensing means and whose voltage is automatically decreased in a controlled manner upon reception of said output signals from either of said sensing means, said capacitor voltage serving to control said phase control means whereby a change in said capacitor voltage produces a change of said AC voltage supplied to said load circuit.

4. Apparatus according to claims 2 or 3 wherein a special process follower circuit is provided which includes a second timer and timer circuit connected to said first timer circuit, wherein both timer circuits are turned on by said output signals from said sensing means and wherein said second timer circuit includes means for delaying the start of a set time delay period provided by said second timer until said first timer times out, said delaying means in combination with said first timer serving also to reset said second timer in the event that said first timer is activated during said time delay period, and means operative when said second timer times out for completing a quick charge circuit to raise said capacitor voltage until said sensing means again develops output signals or until said capacitor voltage obtains a predetermined value for disconnecting said quick charge circuit.

5. Apparatus according to claim 1 wherein said means for developing said AC voltage pulses includes a time delay network and a saturating transformer for producing said voltage pulses following a preselected time delay after zero crossing of said AC voltage supplied by said source.

6. Apparatus according to claim 5 wherein said time delay network includes back to back Zener diodes and an RC network, and wherein said preselected time delay is controlled by selection of Zener diode voltage and ohmic value of the resistors of said RC network.

7. Apparatus according to claim 5 wherein said means for developing said voltage pulses includes opto-isolators, said opto-isolators including light-emitting diodes and light-sensitive transistors.

8. Apparatus according to claim 7 wherein said light-emitting diodes are connected to receive said AC current signals whose instantaneous values and polarities represent the instantaneous values of current drawn from said AC voltage source and wherein said light sensitive transistors are connected to transmit said voltage pulses from said saturating transformer to said automatic control system.

9. Apparatus according to claim 8 wherein said light-emitting diodes are so connected that said AC current signal must have reverse polarity relative to the polarity of said voltage pulses to transmit said voltage pulses to said automatic control system.

10. Apparatus according to claim 1 wherein inhibit means are provided in said automatic control system responsive to said output signals from said AC sensing means for instantly suppressing said output signals from said phase control means, said inhibit means being operative for an interval of set duration.

11. Apparatus according to claim 1 wherein:
a. said means for applying output signals from said phase control means to said gate current supply means employs opto-isolators having light-emitting diodes in the output circuit of said phase control means, and light-sensitive transistors for providing input signals to said gate current supply means;
b. said automatic control system provides means responsive to said output signals of said AC sensing means for by-passing said output signals of said phase control means around said light-emitting diodes of said opto-isolators for an interval of set duration, thereby inhibiting turn-on of said SCR's during said interval.

12. Apparatus according to claim 1 wherein means are provided for supplying to said automatic control system a control current representative of said AC current supplied from said source, and wherein said automatic control system includes current limiting means for phasing back said output signals of said phase control means when said control current tends to exceed a preselected value.

13. Apparatus according to claim 1 wherein means are provided for supplying to said automatic control system a control voltage representative of said AC voltage applied to said load circuit, and wherein said automatic control system includes voltage limiting means for phasing back said output signals of said phase control means when said control voltage tends to exceed a preselected value.

14. Apparatus according to claim 1 including:
 a. inhibit means which prevent application to said automatic control system of said output signals developed by said direct current sensing means, and
 b. switching means operated by said AC current signals momentarily after SCR turn-on to render inoperative said inhibit means, whereby said inhibit means and said switching means prevent any response by said direct current sensing means to transients caused by said SCR turn-on.

15. Apparatus according to claim 1 wherein inhibit means are provided in said automatic control system responsive to said output signals from said DC sensing means for instantly suppressing said output signals from said phase control means, said inhibit means being operative for an interval of set duration.

16. Electronic apparatus providing means for controlling AC voltage and current supplied from a voltage source to a load circuit including the primary of a transformer/rectifier set (T/R set) feeding an electrostatic precipitator which is subject to spitting, sparking, arcing or shorting, said control means including:
 a. inductive series impedance in the circuit of said transformer sufficient to limit transient primary currents to an acceptable maximum value in the event of said spitting, sparking, arcing or shorting in said load circuit;
 b. a pair of silicon controlled rectifiers (SCR's) in inverse parallel connection in circuit with said primary of said transformer of said T/R set;
 c. gate current supply means connected to the gates of said SCR's for controlling the conduction thereof;
 d. phase control means for providing output signals which are phased controlled with respect to said voltage source;
 e. means of supplying voltage representative of said AC voltage source to said phase control;
 f. means for providing an AC control current whose instantaneous values represent the instantaneous values of said AC current supplied to said load circuit;
 g. means for developing a current output signal when said AC control current equals or exceeds a predetermined value and only after a momentary dead interval starting with each turn-on of said SCR's;
 h. spark sensing means for developing output signals in response to sudden changes of current in the load circuit of said T/R set resulting from said spitting and sparking, said spark sensing means being held passive except when rendered operational by said current output signal;
 i. an automatic control system;
 j. means for applying said output signals from said spark sensing means to said automatic control system;
 k. means for applying output signals from said automatic control system to said phase control means;
 l. means for applying output signals from said phase control means to said gate current supply means for controlling the conduction of said SCR's.

17. Electronic apparatus according to claim 16 wherein said phase control means is of the magnetic amplifier type.

18. Electronic apparatus according to claim 17 wherein said automatic control system includes a capacitor which receives charging current to increase its voltage at a controlled rate in the absence of said output signals from said spark sensing means, said capacitor voltage being automatically decreased in a controlled manner upon reception of said output signals from said sparks sensing means, said capacitor voltage serving to control said phase control means whereby a change in said capacitor voltage produces a change of voltage applied to said load circuit.

19. Apparatus according to claim 18 which includes:
 a. opto-isolators responsive to said output signals of said phase control means for controlling said gate current supply means, said opto-isolators having light-emitting diodes which conduct said output signals of said phase control means, and light-sensitive transistors which activate said gate current supply means;
 b. arc sensing means for developing output signals when said arcing or shorting occurs in said precipitator, and means for applying said output signals to said automatic control system, and
 c. means included in said automatic control system being responsive to said output signals from said arc sensing means for by-passing said output signals of said phase control means around said light sensitive diodes of said opto-isolators for a controlled interval thereby to interrupt said gate current supply throughout the duration of said interval.

20. Apparatus according to claim 16 which includes:
 a. arc sensing means for developing output signals when said arcing or shorting occurs in said precipitator, and
 b. means for applying said output signals of said arc sensing means to said automatic control system.

21. Apparatus according to claim 16 wherein means are provided for supplying to said automatic control system a control current representative of said AC current supplied from said source, and wherein said automatic control system includes current limiting means for phasing back said output signals of said phase control means when said control current tends to exceed a preselected value.

22. Apparatus according to claim 16 wherein means are provided for supplying to said automatic control system a control voltage representative of said AC voltage applied to said load circuit, and wherein said automatic control system includes voltage limiting means for phasing back said output signals of said phase control means when said control voltage tends to exceed a preselected value.

23. Control means to phase-control voltage and current obtained from an AC line and applied to the primary winding of a transformer/rectifier set (T/R set) which supplies voltage to an electrostatic precipitator wherein spark discharges of varying intensity, arcs and short circuits occur, said control means including:
 a. silicon controlled rectifiers (SCR's) in said primary circuit;
 b. a current transformer in said primary circuit and means for developing therefrom a current output signal only when said current in said primary circuit equals or exceeds a predetermined value, and only after a momentary dead interval starting with each turn-on of said SCR's;
 c. sensing means for sensing said spark discharges and for developing output signals therefrom;
 d. gate current supply means connected to the gate circuits of said SCR's;
 e. phase control means for providing output signals to said gate current supply means which are phase controlled with respect to said AC line voltage;
 f. an automatic control system for controlling said voltage applied to said primary winding of said T/R set through control of said phase control means, said automatic control system being responsive to said output signals obtained from said sensing means; and
 g. means for applying said output signals from said sensing means to said automatic control system which includes inhibit means for rendering said sensing means inoperative whenever said current output signal obtained from said current transformer is not present, thereby preventing faulty responses to transients caused by turn-on of said SCR's.

24. Apparatus according to claim 23 wherein:
 a. said phase control means is of the magnetic amplifier type;
 b. said means for applying said output signals from said phase control means to said gate current supply means employs opto-isolators having light-emitting diodes responsive to said output signals of said phase control means and isolated light sensitive transistors in the circuit of said gate current supply means;
 c. current limiting means are provided, said means becoming effective when said current in said primary winding tends to exceed a preselected value, for phasing back said output signals of said phase control means;
 d. voltage limiting means are provided, said means becoming effective when the voltage applied to said primary winding of said T/R set tends to exceed a preselected value, for phasing back said output signals of said phase control means;
 e. said automatic control system includes means responsive to signals from said sensing means for bypassing said output signals from said phase control means around said light-emitting diodes of said opto-isolators to interrupt for a controlled dead interval said gate current supply to said SCR's and to phase back said output signals of said phase control means during said dead interval; and
 f. said automatic control system also includes means following termination of said dead interval for phasing forward said output signals of said phase control means thereby to reapply in a controlled manner said voltage supply to said primary winding of said T/R set.

25. Automatic control means which includes silicon controlled rectifiers (SCR's) to phase control voltage obtained from an AC line and applied to a load circuit including a transformer rectifier set (T/R set) which supplies the DC circuit of an electrostatic precipitator wherein spark discharges, arcs and short circuits may occur, said automatic control means including:
 a. means for sensing and responding to transients in said DC current caused by said spark discharges including those which are self-extinguishing and which reduce the DC voltage of said precipitator to a minor extent; and
 b. means for desensitizing said sensing means during momentary intervals starting with each turn-on of said SCR's, thereby inhibiting response of said sensing means to switching transients produced upon said turn-on of said SCR's and entering said DC circuit.

* * * * *